(12) United States Patent
Coons

(10) Patent No.: US 6,188,450 B1
(45) Date of Patent: Feb. 13, 2001

(54) COMPUTER CRT COVER

(76) Inventor: Chad Coons, 310 Delaware, Apt. 314, Kansas City, MO (US) 64105

( * ) Notice: Under 35 U.S.C. 154(b), the term of this patent shall be extended for 0 days.

(21) Appl. No.: 09/490,503

(22) Filed: Jan. 25, 2000

(51) Int. Cl.⁷ .................................................... H04H 5/64
(52) U.S. Cl. ...................... 348/841; 348/818; 312/208.3; 211/86.01
(58) Field of Search ..................... 348/818, 836, 348/840, 841, 842; 312/3, 7.2, 208.3; 248/918; 135/9.3; 150/154, 158, 165, 161; 211/86.01, 88.01, DIG. 1

(56) References Cited

U.S. PATENT DOCUMENTS

| | | | |
|---|---|---|---|
| 2,492,262 | * 12/1949 | Boyden et al. | 312/208.3 |
| 2,953,288 | * 9/1960 | Peterson | 211/86.01 |
| 4,398,212 | * 8/1983 | Serry et al. | 348/836 |
| 4,658,298 | * 4/1987 | Takeda et al. | 348/838 |
| 4,736,853 | * 4/1988 | O'Mara | 211/DIG. 1 |
| 5,398,905 | * 3/1995 | Hinson | 248/918 |
| 5,499,793 | * 3/1996 | Salansky | 248/918 |
| 5,564,209 | * 10/1996 | Zagnoli | 312/7.2 |
| 5,772,293 | * 6/1998 | Hughes | 312/7.2 |
| 5,894,878 | * 4/1999 | Morgan et al. | 312/7.2 |
| 5,988,823 | * 11/1999 | Wong | 348/842 |

* cited by examiner

Primary Examiner—Peter M. Cuomo
Assistant Examiner—Jerry A. Anderson
(74) Attorney, Agent, or Firm—Spencer Fane Britt & Browne LLP

(57) ABSTRACT

A cover for a computer monitor is provided which permits storage of office materials in side flaps attached to the cover and which provides a support platforms for holding documents being examined by the user the invention also provides a shield piece which can quickly be placed over the monitor screen to block viewing of the matter being displayed on the monitor.

9 Claims, 2 Drawing Sheets

COMPUTER CRT COVER

BACKGROUND OF THE INVENTION

The present invention relates to accessories for computers. In particular the present invention provides a cover for a computer cathode ray tube (CRT) or other display monitor which is adapted to provide storage flaps and pockets and to support documents and materials which are being examined by the user while working at the computer.

Typically, computer cathode ray tubes (CRTs or monitors) are relatively large objects to have on a desk top. A 14-inch monitor by screen size is approximately 14 inches wide by 15 inches deep and 16 inches high. A 17-inch monitor is 17 inches wide by 17 inches deep and 17 inches high. These two typically-sized monitors, therefore, consume a great deal of desk-top space and are not particularly mobile. As a result, monitors tend to remain in the location in which they are placed. Thus, when a monitor is in the middle of a desk top having conveniently available drawers, the desk top cannot be used for other purposes. This often results in the monitor being placed on a convenient side table or adjacent to other work area where convenient drawer space and storage space is not present. Thus, it would be of great utility to have available an amount of convenient storage space adjacent to a monitor which is not dependent upon the available table top area for location of the storage space.

A further drawback of the computer monitor or CRT, is that the work on the CRT is available for any passerby to view. While a user can remove the particular work from being displayed on the computer screen, they nevertheless, will have to look at whatever "computer desktop" or computer screen saver image that is installed on the computer. Therefore, a useful alternative to being limited to such screen-saver images or minimizing the program and use, would be a means of quickly covering the viewing screen of the CRT or computer monitor to present either an image of interest to the viewer, or to eliminate the viewing of a dark, blank screen when the computer is turned off.

Yet another drawback with the current computer CRT or monitor is a user must accept the design and coloration and esthetic effect of the computer monitor case that is sold by the manufacture. In view of the immense amount of cubic volume of any desk or work area which a computer monitor consumes, it represents a substantial component of the office or work space decor. Therefore, it would be advantageous for a user to be able to select or redesign the exterior appearance of the monitor to a design selected by the user.

These limitations and drawbacks of the current computer CRT or computer monitor are overcome and corrected by the present invention which permits a user to quickly cover the viewing screen of the CRT when interrupted during work or to simply cover the blank screen when the computer is turned off. In addition, the present invention permits the user to select an appropriate and interesting appearance for the computer CRT or monitor casing which is appropriate to the particular decor and yet pleasant for the user to experience. In addition, the present invention provides the user with convenient and accessible storage areas adjacent to the computer monitor, as well as a means for displaying current materials upon which the user is working so that they are at a convenient location during the input procedure by the user.

These advantages and additional features will be apparent and appreciated by those skilled in the art when the following description of the invention is read in conjunction with the drawings attached hereto which particularly describe a preferred embodiment of the invention.

SUMMARY OF THE INVENTION

The present invention provides a cover and accessory holder for use with a computer CRT or monitor. The present invention allows the user to decorate the exterior of the CRT or monitor and/or to store materials such as floppy disk, pens, pencils, note pads and the like within convenient reach of the user and/or to support papers and documents being examined by the user while working on the computer within view of the user.

The present invention provides, in one embodiment, side covers or panels having side flaps. The side covers are held on the sides of the computer monitor and are decorated to provide the user with a different esthetic aspect to the computer monitor while also providing side flaps having storage areas therein. Yet another embodiment of the present invention provides the previously discussed side covers and flaps which are connected to one another by a screen shield which can be raised and lowered to cover or expose the computer CRT screen. Yet another embodiment of the present invention connects the side panels or pieces and the front screen shield through the use of a decorative perforated material or mesh material which covers the top of the CRT and/or the rear of the CRT and/or the bottom of the CRT in order to provide decorative relief to the existing or factory monitored design while allowing air to circulate within the original monitor case so as to avoid overheating of the cathode ray tube (CRT) while it is in operation. A preferred embodiment which is shown in the accompanying drawings combines many features of these embodiments into a preferred embodiment. However, this combination shown in the drawings is not intended to limit the claims which are appended hereto.

The foregoing and other objects are not meant in a limiting sense and will be readily evident upon a study of the following specification and accompanying drawings comprising a part thereof. Other objects and advantages of this invention will become apparent from the following description taken in connection with the accompanying drawings, wherein is set forth by way of illustration and example, an embodiment of this invention.

DESCRIPTION OF THE DRAWINGS

Preferred embodiments of the invention, illustrative of the best modes in which the applicant has contemplated applying the principles, are set forth in the following description and are shown in the drawings and are particularly and distinctly pointed out and set forth in the appended claims.

DESCRIPTION OF A PREFERRED EMBODIMENT

Figure 1:
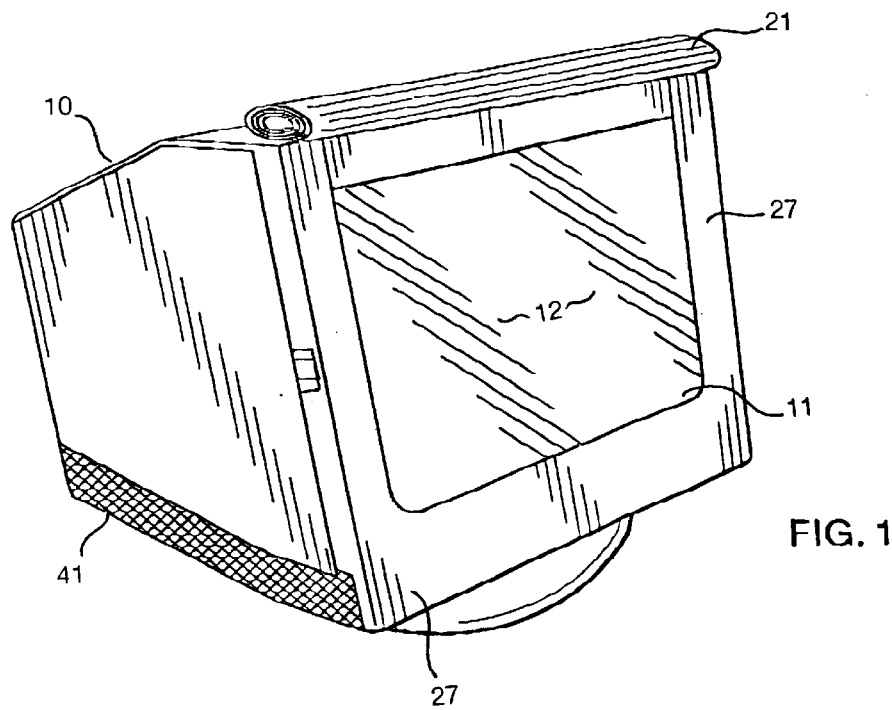
FIG. 1 is a front and left side perspective view of the invention in place on a computer monitor or cathode ray tube device (CRT) with a side flap in the closed position and the screen shield roll-up.

Referring now to FIG. 1, a perspective view of the inventive CRT cover 10 is shown in place on a cathode ray tube or computer monitor 11. On either side of monitor 11 are mounted side covers 16a, 16b which are used to cover the side of the factory provided case of monitor 11. Side covers 16a, 16b are decorated in a fashion suitable to the user and include, on their face, holders 22 (FIG. 2) which can be in the form of pockets of various shapes and sizes to hold different articles. Alternatively, holders 22 can be a large pouch, or netting pouch, in which the computer user can insert objects so they are immediately available during the course of operating the computer. In one embodiment of the invention, only side covers 16a, 16b are provided. Side covers 16a, 16b are held in place by the use of securing straps (FIG. 4) which can be placed across the top of the monitor and/or the bottom of the monitor to secure side covers 16a, 16b in place on monitor 11.

Figure 2:
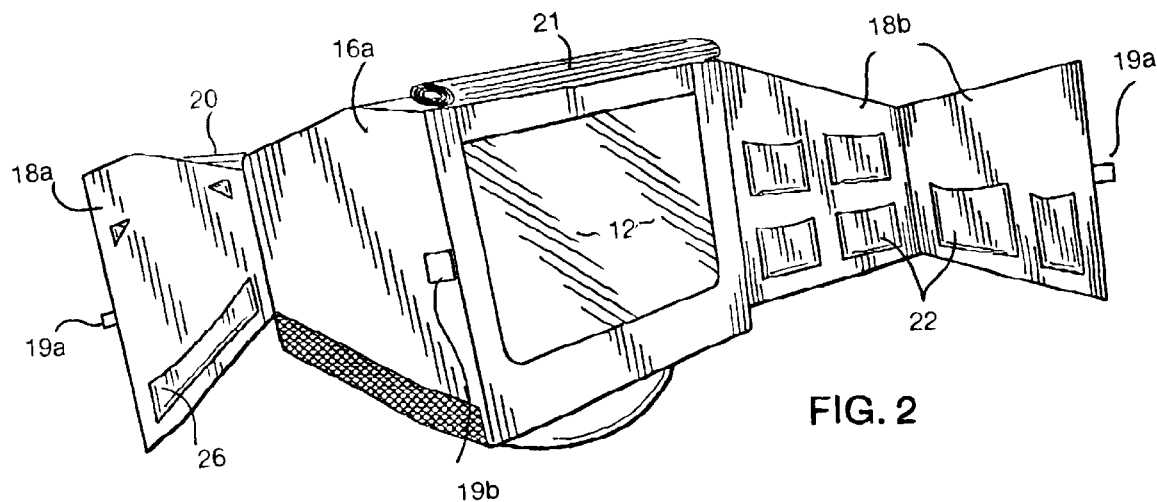
FIG. 2 is a is a front and left side perspective view of the invention in place on a computer monitor or cathode ray tube device (CRT) with the side flaps in the open position and the screen shield roll-up.

Another embodiment of the invention which also is contemplated includes side flaps 18a, 18b (FIG. 1). Side flaps 18a, 18b are attached to Side covers 16a, 16b in a manner to allow side flap 18a, 18b to move from a closed position (FIG. 1) in which side flaps 18a, 18b is directly against cover side 16a, 16b to an open position (FIG. 2) in which side flaps 18a, 18b are at a distance from cover side 16a, 16b such that holders 22 on side cover 16a, 16b are accessible as well as any holders 22 which are on side flap 18a, 18b. Referring to FIG. 2, when it is desired to move side flap 18a, 18b into the open position, side flap closure 19a is released from its opposite member side flap closure 19b to allow side flap 18a, 18b to be moved into the open position. Side flap 18a, 18b can be mounted to side cover 16a, 16b in any convenient manner such as a flap of material providing a hinge-type means or D rings or the direct sewing of side flap 18a, 18b to cover side 16a, 16b. The selected structure only need be suitable to allow movement of flap 18a, 18b between open and closed positions with respect to cover side 16a, 16b to permit the exposing for use holders 22 or the concealing of holders 22 from use.

Holders 22 can be mounted on side cover 16a, b and/or side flap 18a, b. Holders 22 can be in any number of forms such as pockets or slits for holding pens, or a large pouch or a netting pouch. The object being to provide any structure on side 16a, 16b or side flap 18a, 18b which can hold in a convenient location any object which the user may wish to keep at a convenient location while working on the computer.

It will be appreciated by those skilled in the art that side flap 18a, 18b could be allowed to move freely with respect to side 16a, 16b. In such an instance, side flap 18a, 18b could be released by releasing closure 19a from closure 19b to allow side flap 18a, 18b to swing freely. Alternatively, it may be useful in an embodiment to have a retaining strap 20 in place which will limit the distance side flap 18a, 18b will be spaced from cover side 16a, 16b when side flap 18a, 18b is moved into the open position. Retaining strap 20 can be in any number of forms. It can be a piece of cloth or plastic or hinged piece of metal which will collapse out of the way when side flap 18a, 18b is pressed into the closed position against cover side 16a, 16b to allow closure 19a to mate with closure 19b.

Also shown in FIG. 2 is an alternative form of side flap 18a, 18b interior configuration. In the alternative embodiment of side flap 18a, 18b, the side flap interior is used as a text holder 26 which can support documents which the computer user is examining while working at the computer. In this manner, the computer user can face CRT monitor 11 and conveniently glance at side flap 18a, 18b to examine working documents which are placed on text holder 26. In the case of text holder 26 and holders 22 it will be appreciated by those skilled in the art that these can be moveably attached to side flap 18a, 18b or cover side 16a, 16b by a number of different methods. One such method would be by use of a hook and matt type of securing method such as Velcro®. In this embodiment of the invention, side cover 16a, 16b and/or side flap 18a, 18b would be either the matt or the hook portion of the Velcro® fastener and text holder 26 or holders 22 would be backed with the opposite member of the Velcro® fastener to allow repositionable adherence of holders 22 and text holder 26 to side flap 18a, 18b or side cover 16a, 16b. In like manner, various netting pieces and other device holders can be mounted on side flap 18a, 18b or side cover 16a, 16b. It will be appreciated by those skilled in the art that other forms of removable fasteners can be utilized with side flap 18a, 18b and cover side 16a, 16b without departing from the scope and intent of the present invention.

While in one embodiment of the present invention, cover side 16a, 16b are interconnected and secured to the monitor by use of securing straps 28 side cover 16a, 16b alternatively can be joined together at their top-front corners by the inclusion of screen shield 21 which is seen in its rolled-up position in FIG. 1. Screen shield 21 can be flipped up to rest on top of monitor 11 when the user wishes to view CRT screen 12. When the computer is off, or when the user wishes to block the view of CRT screen 12, screen shield 21 can be flipped down (FIG. 3) or rolled down to block the view of screen 12.

Figure 3:
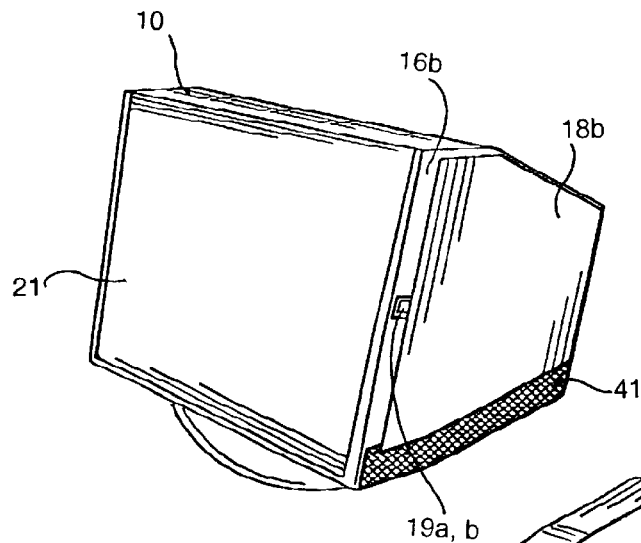
FIG. 3 is a front and right side perspective view of the invention in place on a computer monitor or cathode ray tube device (CRT) with the side flaps in the closed position and the screen shield roll-down.

Referring now to FIG. 3, screen shield 21 can be seen in the down or closed position blocking the view of CRT screen 12. It will be appreciated by those skilled in the art that the front screen shield 21 can be decorated in a fashion to enliven the work atmosphere. One such manner of decoration of screen shield 21 can be the addition of a holder surface as previously described using a hook and matt form type of fastener to allow attachment of various accessories to screen shield 21. One such example of the inclusion of an accessory would be the inclusion of a picture holder which could be emplaced on screen shield 21 to allow the user to insert a photograph or art work of their choice on the front of screen shield 21.

Side covers 16a, 16b also can be held in place by the addition of screen frame piece 27 which connects to side covers 16a, 16b and/or to screen shield 21. Screen frame piece 27 can be decorated itself or simply be used to provide a border for the CRT screen 12 while blocking any manufacturer casing.

Figure 4:
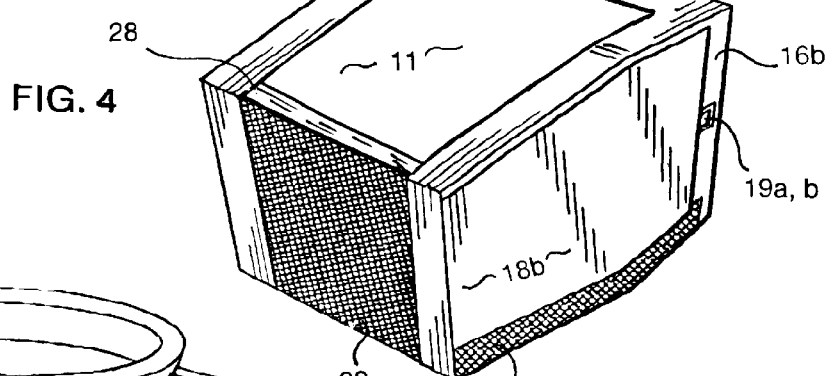
FIG. 4 is a rear and top and left side perspective view of the invention in place on a computer monitor or cathode ray tube device (CRT) with the side flaps in the closed position and the screen shield roll-down.
Figure 5:
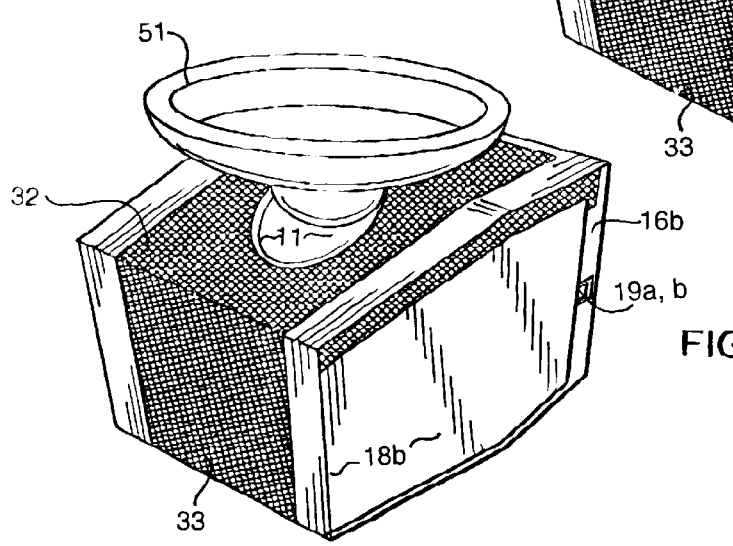
FIG. 5 is a rear and bottom and right side perspective view of the invention in place on a computer monitor or cathode ray tube device (CRT) with the side flaps in the closed position and the screen shield roll-down.

Referring now to FIG. 5, the bottom of computer monitor 11 is shown. Typically, a computer monitor 11 will have a base plate 51 attached thereto to allow swiveling and tilting of the computer monitor for convenience of the user. Often, the bottom of monitor 11 will include holes or perforations in the monitor case to allow convection movement of air through the case to cool the cathode ray tube and equipment contained within monitor 11. While the bottom of monitor 11 is generally not in view, it may be necessary and useful to provide CRT cover 10 with a bottom portion in order to secure side cover 16a, 16b to monitor 11. While sides 16a, 16b could be secured to monitor 11 using securing straps 28 (FIG. 4) on either the bottom of monitor 11 or the top of monitor 11, it may be useful to utilize a mesh-type of material to more completely secure side 16a, 16b to monitor 11. As shown in FIG. 5, such a mesh is attached to sides 16a, 16b and covers the bottom of the CRT or monitor bottom 11. It will be appreciated by those skilled in the art that certain portions of monitor 11 will contain air vents or air convection holes to allow air to pass in and out of the case of monitor 11 to cool the CRT tube contained therein. Therefore, it is an important aspect of the present invention that such air holes in monitor 11 not be covered up by CRT cover 10. This is achieved through the use of a perforated material or a mesh to complete the structure of cover 10 in areas of the monitor which contain such vents or air-convection holes. In this manner, CRT cover 10 can have a structural component on the top or bottom or the rear of CRT monitor 11 which can assist in holding sides 16a, 16b and shield 21 in place but which does not obstruct the passage of air in and around the CRT tube of monitor 11 for cooling purposes.

An example of such mesh area 41 being used to complete the construction of side covers 16a, 16b is shown in FIGS. 3 and 4. It will be appreciated by those skilled in the art that this feature of CRT cover 10 renders the purpose and objectives of CRT cover 10 completely distinct and different from that of the widely observed dust cover which might be placed on a computer or computer monitor 11. In the case of a dust cover, the intent is to completely cover the piece of equipment so as to exclude dust from settling on the monitor. Necessarily, the inclusion of a porous material or perforations in the material is antithetical to the use and intent of a dust cover. Therefore, the present invention teaches against the concepts embodied in dust covers which have long been associated with computer monitors and computers.

Referring now to FIG. 5, the use of the porous material or mesh material or perforated cloth to construct perforated bottom 32 is shown. Also, the use of the same porous or perforated material to construct perforated rear portion 33 is shown in FIG. 4. It is of further benefit that the porous material or perforated material or netting used to construct a perforated top or perforated bottom 32 or perforated rear 33 be sufficiently flexible to allow the power cord to pass through perforated panel 41, 32, 33 in order to connect the power cord into monitor 11. In addition, the flexibility of netting or perforated material is advantageous in allowing the data transfer cable or signal cable which runs between monitor 11 and the computer to which it is attached to be placed through CRT cover 10 for connection to monitor 11.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Certain changes may be made in embodying the above invention, and in the construction thereof, without departing from the spirit and scope of the invention. It is intended that all matter contained in the above description and shown in the accompanying drawings shall be interpreted as illustrative and not meant in a limiting sense.

Having now described the features, discoveries and principles of the invention, the manner in which the inventive computer monitor cover is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

Having thus described the invention what is claimed as new and desired to be secured by Letters Patent is as follows:

1. An accessory holder for computer monitor, the monitor having a viewing screen, said accessory holder comprising:
   first and second side panels to cover the sides of the computer monitor,
   a shield piece connecting said first and second side panels, said shield piece adapted to cover the viewing screen of the monitor to prevent observance of the contents of the monitor viewing screen,
   a flap attached to at least one of said side panels, said flap being movable between open and closed positions, said flap, when in said open position, exposing for use at least one storage holder, said storage holder being concealed from use when said flap is in said closed position, and
   means for securing said accessory holder in position on said monitor.

2. The apparatus as claimed in claim 1 wherein said means for securing is a strap to hold said side panels in place on said monitor.

3. The apparatus as claimed in claim 1 further comprising a top panel comprising a perforated material to permit airflow therethrough, said top panel connecting said first and second side panels.

4. The apparatus as claimed in claim 1 further comprising a bottom panel comprising a perforated material to permit airflow therethrough, said bottom panel connecting said first and second side panels.

5. The apparatus as claimed in claim 1 further comprising a rear panel comprising a perforated material to permit airflow therethrough, said rear panel connecting said first and second side panels.

6. The apparatus as claimed in claim 1 wherein said shield piece is comprised of a flexible material having one edge attached to a top of a border piece to permit said shield to be rolled-up and placed atop said monitor for out-of-the-way storage of said shield during monitor usage.

7. A computer monitor covering comprising:
   first and second side panels to cover the sides of the computer monitor,
   a shield piece connecting said first and second side panels, said shield piece adapted to cover said viewing screen of said monitor to prevent observance of the contents of the monitor viewing screen
   a top panel comprised of a perforated material to allow airflow therethrough, said top panel connecting said first and second side panels and said shield piece
   an openable and closeable hinged flap attached to at least one of said side panels means for securing said side cover panels to said monitor.

8. The apparatus as claimed in claim 7 further comprising a border piece adapted to cover a front case portion of a monitor surrounding a viewing screen while permitting viewing of the monitor screen by a user.

9. A computer monitor covering comprising:
   a border piece adapted to cover the front case portion of the monitor surrounding the viewing screen while permitting viewing of the monitor screen by a user,
   a shield piece attached to said border piece, said shield piece adapted to cover said viewing screen of said monitor to prevent observance of the contents of the monitor viewing screen, first and second side panels to cover the sides of the computer monitor, a top panel comprised of a perforated material to allow airflow therethrough, said top panel connecting said first and second side panels and said shield piece an openable and closeable hinged flap attached to at least one of said side panels means for securing said side cover panels to said monitor.

* * * * *